(12) United States Patent
Takahashi et al.

(10) Patent No.: US 8,085,351 B2
(45) Date of Patent: Dec. 27, 2011

(54) OBJECT RECOGNIZING DISPLAY DEVICE

(75) Inventors: Seiki Takahashi, Chunan-si (KR);
Bong-Hyun You, Yongin-si (KR);
Hee-Jin Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 313 days.

(21) Appl. No.: 12/403,589

(22) Filed: Mar. 13, 2009

(65) Prior Publication Data

US 2009/0231511 A1 Sep. 17, 2009

(30) Foreign Application Priority Data

Mar. 13, 2008 (KR) .................. 10-2008-0023417

(51) Int. Cl.
*G02F 1/1335* (2006.01)

(52) U.S. Cl. ....................................................... 349/16
(58) Field of Classification Search ..................... 349/16
See application file for complete search history.

(56) References Cited

U.S. PATENT DOCUMENTS

| | | | |
|---|---|---|---|
| 5,926,238 A * | 7/1999 | Inoue et al. | 349/61 |
| 6,661,478 B1 | 12/2003 | Wakahara | |
| 7,859,621 B2 * | 12/2010 | Zhang et al. | 349/116 |
| 2004/0174475 A1 | 9/2004 | Lan et al. | |
| 2007/0296688 A1 | 12/2007 | Nakamura et al. | |
| 2008/0006828 A1 | 1/2008 | Zhang et al. | |

FOREIGN PATENT DOCUMENTS

FR 2906379 A1 3/2008
JP 2006003857 A 1/2006

OTHER PUBLICATIONS

EPO International Search Report; Jul. 16, 2009; European Patent Application No. 09003259.0.

* cited by examiner

*Primary Examiner* — Sung Pak
(74) *Attorney, Agent, or Firm* — Cantor Colburn LLP

(57) ABSTRACT

A display device includes: a first substrate; a gate line formed on the first substrate; a first switching device connected to the gate line; a pixel electrode connected to the first switching device; a light-receiving device formed on the first substrate and which senses infrared light; and a light-shielding pattern disposed between the first substrate and the light receiving device. The light-shielding pattern overlaps the light-receiving device and blocks light.

29 Claims, 10 Drawing Sheets

OBJECT RECOGNIZING DISPLAY DEVICE

This application claims priority to Korean Patent Application No. 10-2008-0023417, filed on Mar. 13, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device, and more particularly, to a display device which recognizes an object proximate to, e.g., near, the display device.

2. Description of the Related Art

As society becomes more dependent on sophisticated information and communication technology, market demand for larger and thinner display devices are increasing. Conventional cathode ray tubes ("CRTs"), however, fail to satisfy the market demand for larger and thinner display devices. As a result, market demand for flat panel displays ("FPDs") such as plasma display panels ("PDPs"), plasma address liquid crystal display panels ("PALCs"), liquid crystal displays ("LCDs") and organic light emitting diodes ("OLEDs"), for example, is rapidly increasing.

Display devices are also evolving to include a recognition function, e.g., to receive external information, in addition to displaying images. Specifically, an example of a display device which includes a recognition function is a touch screen display device.

Further, touch screen display devices are cutting-edge input devices which are implemented to replace a keyboard and/or a mouse, for example, in a computer system. To perform a desired task such as inputting information using a touch screen display device, a user typically touches a touch screen, which is implemented on a display panel, with their hand or a stylus, for example. Thus, touch screen display devices are ideal devices to enable a user to perform an intuitive task in a graphic user interface ("GUI") environment operating system. Touch screen display devices are used extensively in application fields such as computer-based training and simulation, office automation, education and games for example.

However, since a touch screen display device of the prior art is designed to sense pressure applied to a touch panel surface thereof, a mechanical operation of the touch screen display device is required, wherein a user physically touches the touch screen, as described above. However, mechanical operation undermines reliability and accuracy of the touch screen display devices.

Thus, improved technology for a display panel is required. In particular, there is a need for a display device which senses an object proximate to, e.g., physically near, the display device, even when polarizers, which would normally prevent sensing the object, are formed on surfaces of the display panel.

BRIEF SUMMARY OF THE INVENTION

An exemplary embodiment of the present invention provides a display device which senses an object proximate to, e.g., physically near, the display device, even when polarizers, which would normally prevent sensing the object, are formed on surfaces of the display panel.

It will be noted that exemplary embodiments of the present invention are not restricted to those described herein. Further, the above and other aspects, features and advantages of the present invention will be more readily apparent to one of ordinary skill in the art by referencing exemplary embodiments of the present invention as described herein.

According to an exemplary embodiment of the present invention, a display device includes: a first substrate; a gate line formed on the first substrate; a first switching device connected to the gate line; a pixel electrode connected to the first switching device; a light-receiving device formed on the first substrate and which senses infrared light; and a light-shielding pattern disposed between the first substrate and the light-receiving device. The light-shielding pattern blocks light.

According to an alternative exemplary embodiment of the present invention, a display device including: a display panel which displays images; a first polarizer disposed on a first outer surface of the display panel; a second polarizer disposed on an opposite second outer surface of the display panel; and an infrared light source disposed on an outer peripheral side of the display panel. The infrared light source provides infrared light to the display panel, and the display panel comprises a light-receiving device which senses the infrared light.

BRIEF DESCRIPTION OF THE DRAWINGS

The above and other aspects, advantages and features of the present invention will become more readily apparent by describing in further detail exemplary embodiments thereof with reference to the accompanying drawings, in which.

DETAILED DESCRIPTION OF THE INVENTION

Figure 1A:
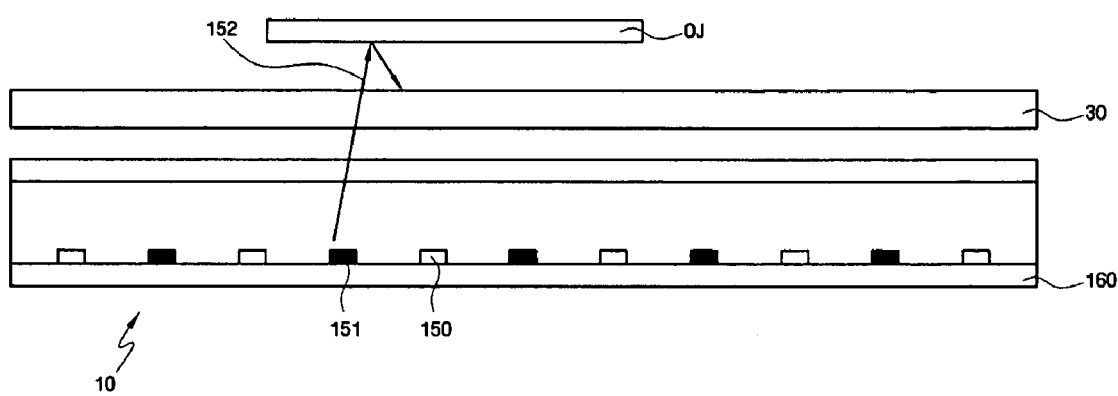
FIG. 1A is a partial cross-sectional view of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1B:
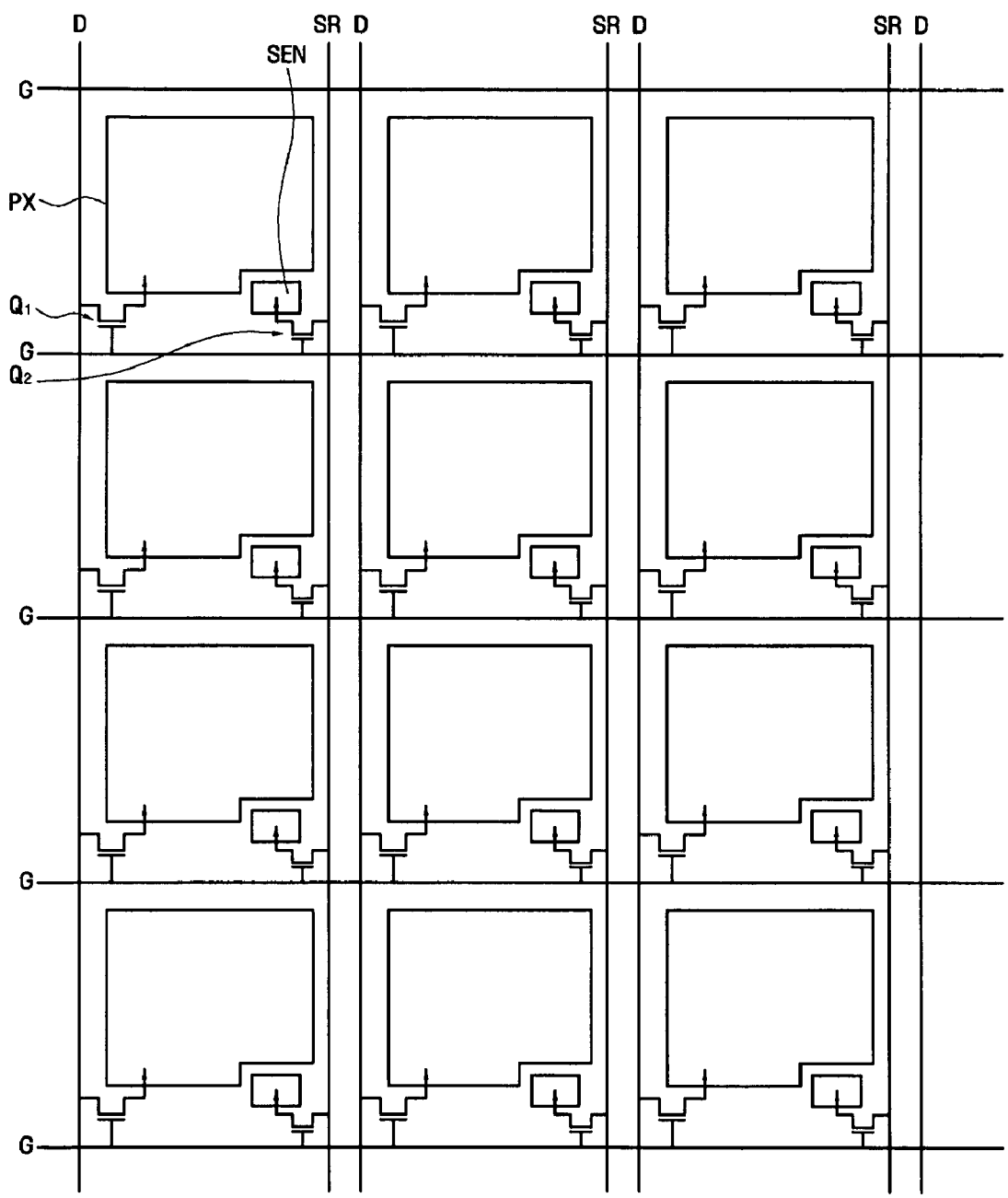
FIG. 1B is a schematic plan view of the display device according to the exemplary embodiment of the present invention shown in FIG. 1A.
Figure 2:
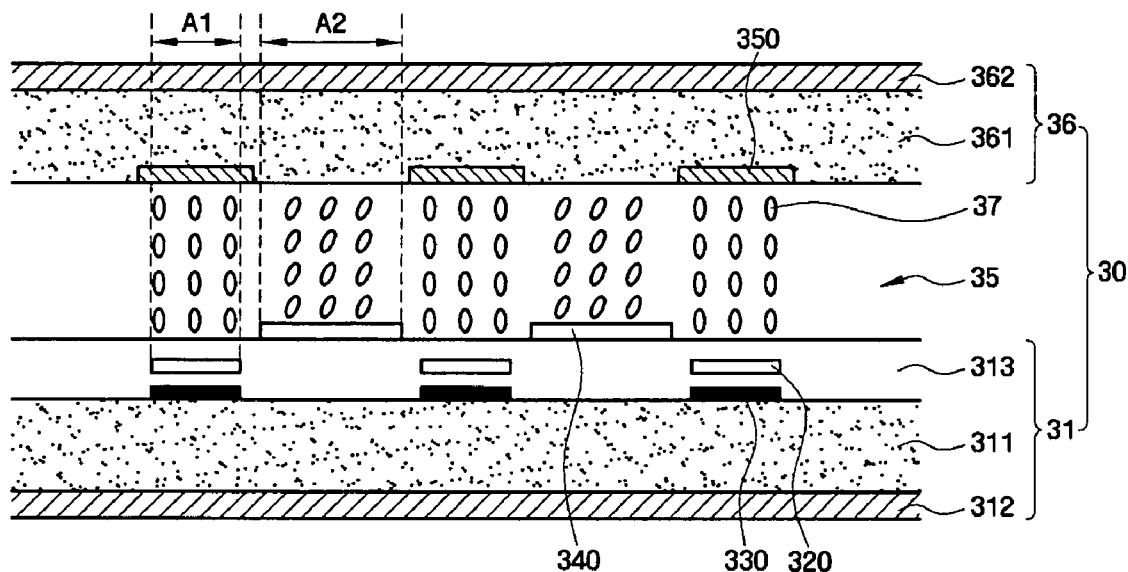
FIG. 2 is a partial cross-sectional view of a display panel of the display device according to the exemplary embodiment of the present invention shown in FIG. 1A.
Figure 3:
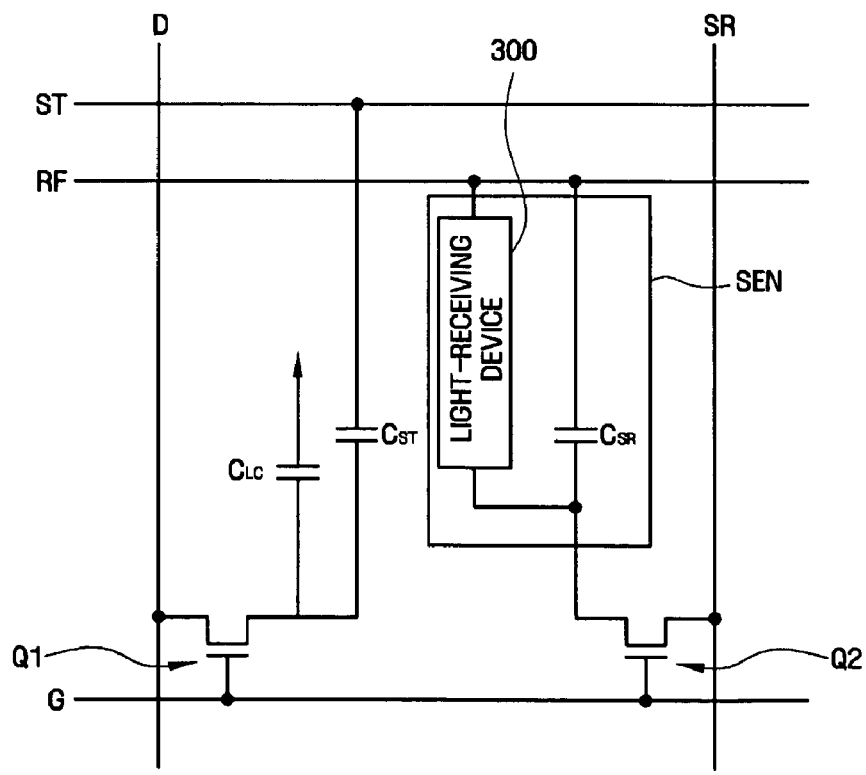
FIG. 3 is an equivalent schematic circuit diagram of a pixel of the display device according to the exemplary embodiment of the present invention shown in FIGS. 1A and 1B.

A display device according to a first exemplary embodiment of the present invention will now be described in further detail with reference to FIGS. 1A through 3. FIG. 1A is a partial cross-sectional view of a display device according to an exemplary embodiment of the present invention. FIG. 1B is a schematic plan view of the display device according to the exemplary embodiment of the present invention shown in FIG. 1A. FIG. 2 is a partial cross-sectional view of a display panel of the display device according to the exemplary embodiment of the present invention shown in FIG. 1A. FIG. 3 is an equivalent schematic circuit diagram of a pixel of the display device according to the exemplary embodiment of the present invention shown in FIGS. 1A and 1B.

Referring to FIG. 1A, a display device 10 according to an exemplary embodiment of the present invention includes an infrared sensor (not shown) in a display panel 30 to recognize an object OJ which is located proximate to, e.g., above the display panel 30 in FIG. 1. In addition, the display device 10 includes infrared lamps 151 and light sources 150. The infrared lamps 151 and the light sources 150 are disposed under the display panel 30, and light, emitted from the infrared lamps 151 and the light sources 150, passes through the display panel 30 and is reflected by the object OJ. More specifically, infrared light 152, which corresponds to light in an infrared region, is reflected by the object OJ and is then sensed by the infrared sensor (not shown). As a result, the object OJ proximate to the display panel 30 is recognized. In an exemplary embodiment of the present invention, visible light (not shown) emitted from the light sources 150 and which corresponds to light in a visible light region, is blocked by two polarizers (not shown) attached to the display panel 30 or, alternatively, by a separate light-shielding pattern (not shown). On the other hand, the infrared light 152, which corresponds to the infrared region, is transmitted through the two polarizers due to its long wavelength, relative to a wavelength of the visible light. Thus, the infrared sensor senses the infrared light 152 of the infrared region regardless of the polarizers attached to the display panel 30 or a state, e.g., an alignment, of a liquid crystal layer (not shown), as will be described in further detail below.

When the infrared sensor (not shown) is disposed in the display panel 30 as described above, a distance between the object OJ and the infrared sensor is reduced. Thus, the object OJ is recognized more accurately, and a complex image based on the object is recognized by the display device 10 according to an exemplary embodiment of the present invention.

In addition, an object as large as the display panel 30, for example, can be recognized. Further, images can be recognized more accurately since a diffusion layer is not required to be disposed between the display panel 30 and the object OJ. A structure of the display panel 30 according to an exemplary embodiment will be described in further detail below.

Referring now to FIGS. 1B through 3, the display device 10 further includes a lower display panel 31. The lower display panel 31 includes thin-film transistors ("TFTs"), each connected to a gate line G and a data line D. The display device 10 further includes an upper display panel 36 which is disposed opposite to, e.g., facing, the lower display panel 31 and which includes a common electrode (not shown) and a liquid crystal layer 35 interposed between the lower display panel 31 and the upper display panel 36. A first polarizer 312 and a second polarizer 362 are disposed on outer surfaces of the upper display panel 36 and the lower display panel 31 respectively. In an exemplary embodiment, the first polarizer 312 and the second polarizer 362 are disposed orthogonal to each other, e.g., polarizations thereof are at right angles to each other.

Referring to FIG. 1B, the gate line G extends in a first direction, substantially horizontal in FIG. 1B, on a first substrate 311 (FIG. 2). In an exemplary embodiment, the gate line G is made of an aluminum (Al)-based metal such as Al or an Al alloy, a silver (Ag)-based metal such as Ag or an Ag alloy, a copper (Cu)-based metal such as Cu or a Cu alloys, a molybdenum (Mo)-based metal such as Mo or a Mo alloy, chrome (Cr), titanium (Ti) or tantalum (Ta), for example, but alternative exemplary embodiments are not limited thereto.

In addition, the gate line G may have a multi-layer structure including two or more conductive layers (not shown) having different physical characteristics. For example, a first conductive layers may be made of a metal with low resistivity, such as an Al-based metal, an Ag-based metal or a Cu-based metal in order to reduce a signal delay or a voltage drop of the gate line G. A second conductive layer disposed on the first conductive layer may be made of a different material, such as a material having superior contact characteristics with indium tin oxide ("ITO") and indium zinc oxide ("IZO"), such as a Mo-based metal, Cr, Ti or Ta, for example, but not being limited thereto. A gate line G having the multi-layer structure may include a combination of a Cr lower layer and an Al upper layer or, alternatively, a combination of an Al lower layer and a Mo upper layer, for example. However, alternative exemplary embodiments of the present invention are not limited thereto; rather the gate line G may be made of other metals and/or conductors.

The data line D is formed on the gate line G, and is electrically insulated from the gate line G. Further, the data line D extends in a second direction opposite the first direction, e.g., substantially vertically, as shown in FIG. 1B.

Thus, the gate lines G and the data lines D are arranged in a substantially lattice or matrix pattern on the first substrate 311. In an exemplary embodiment of the present invention, the gate lines G and the data lines D define pixels of the display device 10.

In an exemplary embodiment, the data line D may be a single layer structure or, alternatively, may include multiple layers made of at least one material selected from a group including Al, Cr, Mo, Ta and Ti, for example.

Referring to FIGS. 1B and 3, a first switching device Q1 controls light which passes through each pixel. In an exemplary embodiment the first switching device Q1 is formed as a TFT. More specifically, the first switching device Q1 may be a TFT which includes a gate electrode (not shown), a source electrode (not shown) and a drain electrode (not shown) as terminals thereof. In this case, each terminal is connected to the gate line G, the data line D and a pixel electrode 340 (FIG. 2).

In an exemplary embodiment, the pixel electrode 340 is formed in a shape substantially similar to a shape of a pixel unit PX (FIG. 1B). In operation, the pixel electrode 340 receives a data voltage, generates an electric field with the common electrode (not shown) of the upper display panel 36, and thereby determines an alignment of liquid crystal molecules 37 of the liquid crystal layer 35 interposed between the pixel electrode 340 and the common electrode.

A second switching device Q2 (FIGS. 1B and 3) connects a sensor unit SEN to a sensor line SR and controls a signal generated by a light-receiving device 320. In an exemplary embodiment of the present invention, the second switching device Q2 is formed as a TFT. Terminals of the second switching device Q2 are connected to the gate line G, the sensor unit SEN and the sensor line SR.

The sensor unit SEN senses light at a predetermined wavelength to recognize an image based on the object OJ (FIG. 1A), and includes the light-receiving device 320, a light-shielding pattern 330 and an optical filter 350 (FIG. 2). In an exemplary embodiment, a sensor unit SEN is formed in each pixel, but alternative exemplary embodiments are not limited thereto. For example, a density of the sensor units SEN may be adjusted as desired, e.g., each pixel need not have a sensor unit SEN. The density of the sensor units SEN determines a resolution of an image recognized based on light reflected by the object OJ.

The light-receiving device 320 receives light and outputs a signal based on the received light. In an exemplary embodiment of the present invention, the light-receiving device 320 a device such as a TFT, a photodiode, or a photoresistor, for example, but alternative exemplary embodiments are not limited thereto. Further, the light-receiving device 320 may include a semiconductor layer such as a PN diode or a PIN diode, for example. In addition, the semiconductor layer of the light-receiving device 320 may be made of amorphous silicon ("a-Si"), polycrystalline silicon ("p-Si") or crystalline silicon ("c-Si"), for example. In an exemplary embodiment of the present invention, the semiconductor layer is made of hydrogenated amorphous silicon germanium ("a-SiGe:H").

The light-receiving device 320 is formed on the first substrate 311 and senses light of the infrared region, e.g., the infrared light 152 shown in FIG. 1A. The infrared light 152 has a longer wavelength than visible light 153 (FIG. 6) and thus passes through the first polarizer 312 and the second polarizer 362 formed on outer surfaces of the first substrate 311 and a second substrate 361, respectively. Thus, in a display device 10 according to an exemplary embodiment of the present invention, the infrared light 152 passes through the first polarizer 312 and the second polarizer 362, even though the first polarizer 312 and the second polarizer 362 are orthogonal to each other. Further, the infrared light 152 passes through the display panel 30 regardless of an alignment of liquid crystal molecules 37 of the display panel 30.

Thus, the infrared light 152, which is emitted from the infrared lamps 151 disposed under the display panel 30, passes through the display panel 30, is reflected by the object OJ (FIG. 1) located on an outer side of the second polarizer 362, and is then sensed by the light-receiving device 320. Processes in which the infrared light 152 and the visible light 153 pass through the display panel 30 will be described in further detail below.

Referring to FIG. 2, the light-shielding pattern 330 blocks light and is disposed under the light-receiving device 320. The light-shielding pattern 330 blocks light which would otherwise be received by the light-receiving device 320 from under the display panel 30. Thus, the light-shielding pattern 330 is disposed under the light-receiving device 320 to block light which is received from under the display panel 30, preventing the light-receiving device 230 from receiving light from under the display panel 30, and thereby substantially reducing or eliminating erroneous detection of light from under the display panel 30 by the light-receiving device 320. In an exemplary embodiment of the present invention, the light-shielding pattern 330 is approximately a same width as the light-receiving device 320, as shown in FIG. 2. In an alternative exemplary embodiment, however, the light-shielding pattern 330 may be slightly wider than the light-receiving device 320 (not shown) or, alternatively, the light-receiving device 320 may completely overlap the light-shielding pattern 330 (not shown). Further, the light-shielding pattern 330 and the gate line G may be formed of a same material, but alternative exemplary embodiments are not limited thereto.

The optical filter 350 is formed above the light-receiving device 320. The optical filter 350 selectively transmits light in a predetermined wavelength region. Specifically, the optical filter 350 blocks light of wavelengths other than wavelengths corresponding to infrared light. Therefore, from among all light incident to the optical filter 350 from above the display panel 30, only the infrared light 152, which is reflected by the object OJ, passes through the optical filter 350.

In an exemplary embodiment of the present invention, the light-receiving device 320 is formed between the optical filter 350 and the light-shielding pattern 330, and the optical filter 350 is formed on the second substrate 361, as shown in FIG. 2.

Light, which is incident to the display panel 30 from under the display panel 30, is blocked by the light-shielding pattern 330, while light, which is incident to the display panel 30 from above the display panel 30, is selectively passed through the display panel 30 by the optical filter 350.

In an exemplary embodiment, the optical filter 350 includes a semiconductor layer made of a-SiGe:H and/or hydrogenated amorphous silicon ("a-Si:H"), for example.

Further, an energy band gap of the optical filter 350 is wider than an energy band gap of the light-receiving device 320. For example, the optical filter 350 may have an energy band gap of approximately 1.6 electron volts ("eV"), and the light-receiving device 320 may have an energy band gap of approximately 1.5 eV. In this case, light received from above the display panel 30 which has an energy of approximately 1.6 eV or more is absorbed by the optical filter 350. Put another way, light having a shorter wavelength than a reference wavelength is absorbed by the optical filter 350, while light having a longer wavelength than the reference wavelength passes through the optical filter 350 and is delivered to the light-receiving device 320. The light-receiving device 320 absorbs and thus senses light having an energy of approximately 1.5 eV or more and transmits light having an energy of less than 1.5 eV. Thus, the light-receiving device 320 senses light having an energy of approximately 1.5 eV to approximately 1.6 eV.

The light-receiving device 320 and the optical filter 350 may be disposed in different ways in alternative exemplary embodiments of the present invention. For example, the light-receiving device 320 may include a-SiGe:H while the optical filter 350 includes a-Si:H. Alternatively, the light-receiving device 320 may include p-Si while the optical filter 350 includes a-SiGe:H.

Figure 4A:
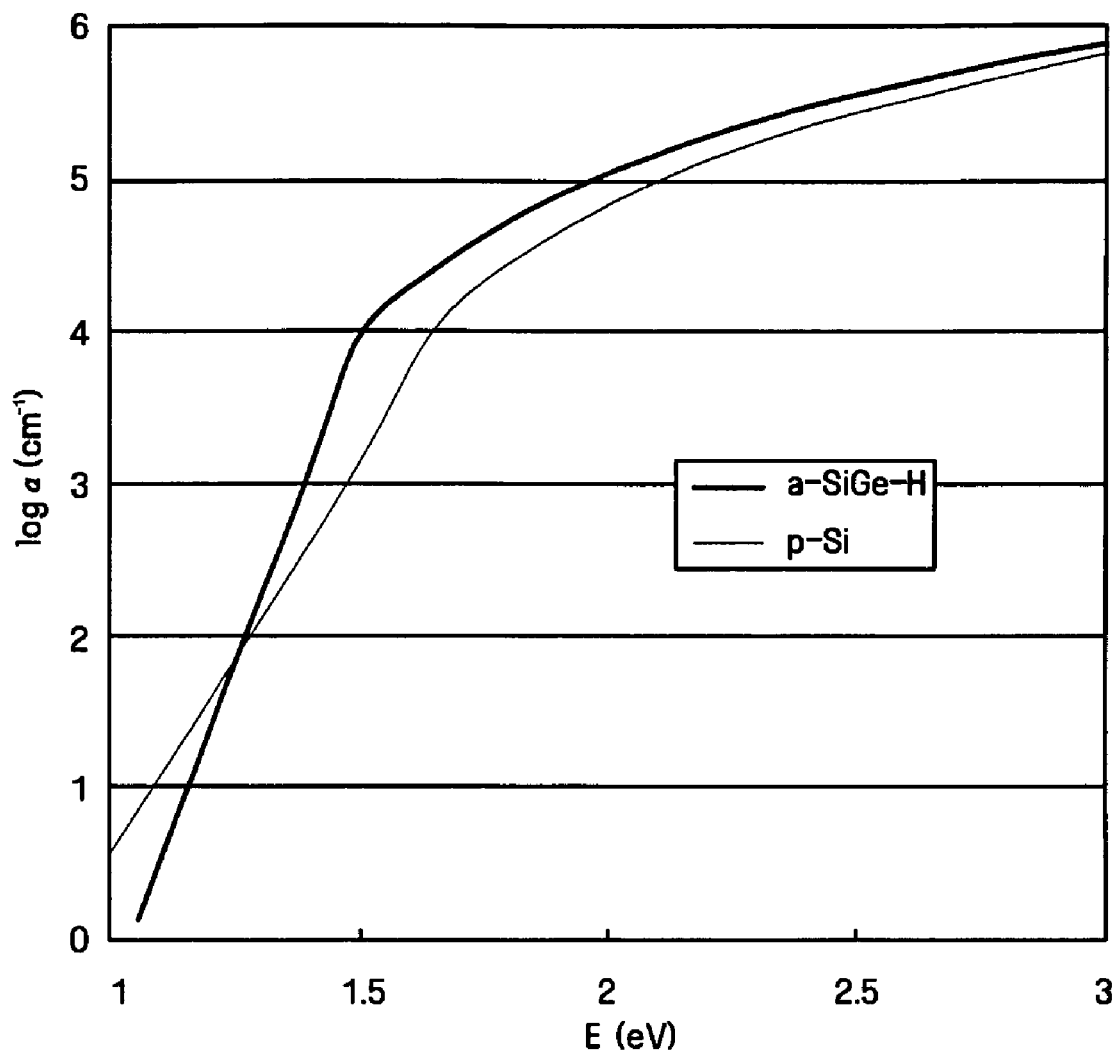
FIG. 4A is a graph of light energy versus light-absorbing coefficients illustrating light-absorbing coefficients of a-SiGe:H and p-Si versus light energy.
Figure 4B:
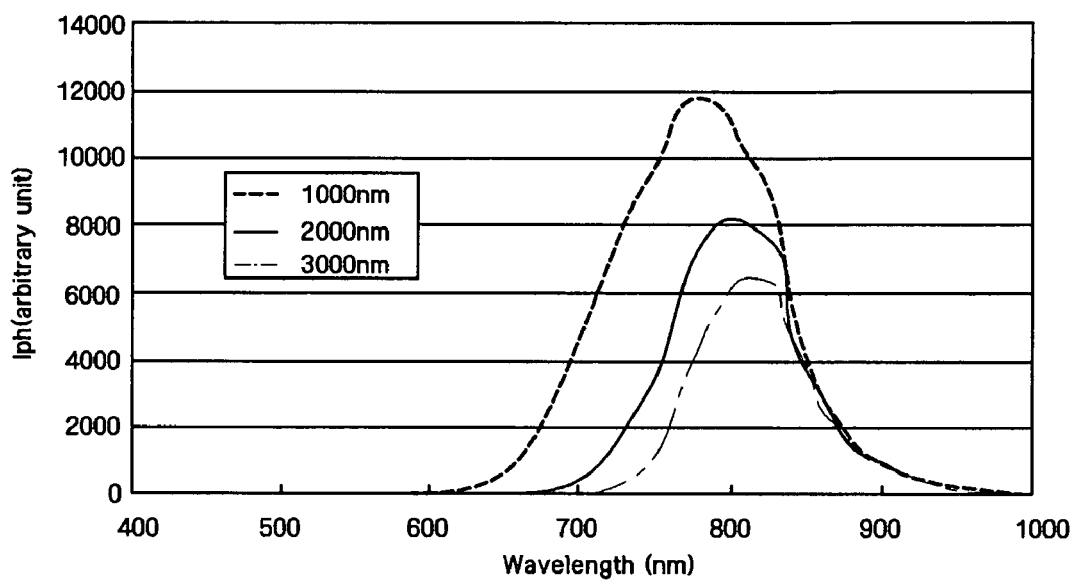
FIG. 4B is a graph of wavelength versus photocurrent illustrating wavelength characteristics with respect to a thickness of optical filters of a display panel according to an exemplary embodiment of the present invention.

Hereinafter, characteristics based on different thicknesses of the optical filter 350 of the display device 10, which includes the optical filter 350 made of a-SiGe:H and the light-receiving device 320 made of p-Si, will be described in further detail with reference to FIGS. 4A and 4B. FIG. 4A is a graph of light energy versus light-absorbing coefficients illustrating light-absorbing coefficients of a-SiGe:H and p-Si versus light energy. FIG. 4B is a graph of wavelength versus photocurrent illustrating wavelength characteristics with respect to a thickness of optical filters of a display panel according to an exemplary embodiment of the present invention.

In FIG. 4A, a horizontal axis of the graph indicates energy of light (in eV). The energy of the light inversely corresponds to the light at each wavelength band. Specifically, light of a short wavelength has high energy, while light of a relatively long wavelength has relatively low energy. A vertical axis of the graph is (logarithmic) light-absorbing coefficients α of a-SiGe:H and p-Si based on the energy of each light.

For purposed of illustration, it will be assumed that the light-absorbing coefficient of the optical filter 350 is αf and that the light-absorbing coefficient of the light-receiving device 320 is αs. In addition, it will be assumed that a thickness of the optical filter 350 is d and that a photocurrent generated based on the above-mentioned variable is Iph. In this case, a relationship between the photocurrent Iph and the abovementioned coefficients is defined by Equation (1).

$$Iph \propto \alpha s^{(-\alpha f \times d)}$$  Equation (1)

FIG. 4B is a characteristic graph of the display device 10 which includes the optical filter 350 made of a-SiGe:H and the light-receiving device 320 made of p-Si. Further, the graph of FIG. 4B is based on Equation (1). A horizontal axis of the graph of FIG. 4B indicates a wavelength, and a vertical axis thereof indicates photocurrent Iph. Equation (1) is a proportional expression of the photocurrent Iph, and the vertical axis of the graph of FIG. 4B represents the photocurrent Iph measured in arbitrary units which represent a relative value of the photo current Iph.

Curves in FIG. 4B show characteristics based different values for the thickness d of the optical filter 350. Specifically, when the optical filter 350 has a thickness d of approximately 1,000 nm, approximately 2,000 nm and approximately 3,000 nm, the optical filter 350 exhibits superior reactivity to infrared light. As a result, the light-receiving device 320 can better sense the infrared light. However, if the optical filter 350 has a thickness greater than approximately 3,000 nm, a peak point of the photocurrent Iph is adversely affected, e.g., reduced, as shown in FIG. 1. As a result, the ability of the light-receiving device 320 to sense the infrared light deteriorates. Specifically, when the optical filter 350 has a thickness of approximately 3,000 nm, the photocurrent Iph peaks at a wavelength of approximately 817 nm. Thus, in an exemplary embodiment of the present invention, the optical filter 350 has a thickness of less than approximately 3,000 nm. Further, the optical filter 350 according to an exemplary embodiment has a thickness of approximately 1,000 nm or greater, in order to reduce absorption of visible light.

In an exemplary embodiment, the light-receiving device 320 and the light-shielding pattern 330 may be formed in a TFT array 313 (FIG. 2) disposed on the first substrate 311, but alternative exemplary embodiments of the present invention are not limited thereto. For example, the light-receiving device 320 and the light-shielding pattern 330 may be formed anywhere between the first substrate 311 and the second substrate 361.

Referring again to FIG. 2, the display panel 30 includes a sensor region A1 and a pixel region A2. The sensor region A1 substantially overlaps the light-receiving device 320, and the pixel region A2 substantially overlaps the pixel electrode 340. Since the pixel region A2 overlaps the pixel electrode 340, liquid crystal molecules 37 of the liquid crystal layer 35 in the pixel region A2 move in response to a data voltage applied to the pixel electrode 340. However, since the sensor region A1 does not overlap the pixel electrode 340, liquid crystal molecules 37 of the liquid crystal layer 35 in the sensor region A1 do not move, e.g., the liquid crystal molecules 37 of the liquid crystal layer 35 in the sensor region A1 maintain an initial alignment thereof during operation of the display device 10 according to an exemplary embodiment of the present invention. For example, in a vertical alignment mode display device 10, liquid crystal molecules 37 are initially aligned substantially vertically in the liquid crystal layer 35, as shown in the sensor region A1 in FIG. 2. Thus, visible light cannot pass through the sensor region A1. Processes in which infrared light and visible light pass through the display panel 30 will be described in further detail below.

Referring now to FIG. 3, a pixel of the display device 10 includes the first switching device Q1, the second switching device Q2, a liquid crystal capacitance $C_{LC}$, a storage capacitance $C_{ST}$, a sensor capacitance $C_{SR}$ and the light-receiving device 320.

The liquid crystal capacitance $C_{LC}$ is formed by the common electrode (not shown) of the upper display panel 36 and the pixel electrode 340, with the liquid crystal layer 35 interposed therebetween as a dielectric material. The storage capacitance $C_{ST}$ is formed by a storage electrode (not shown) and at least a portion of the pixel electrode 340 which overlaps the storage electrode. In an exemplary embodiment, the liquid crystal capacitance $C_{LC}$ and the storage capacitance $C_{ST}$ enable the display panel 30 to continuously display images.

A terminal of the light-receiving device 320 is connected to a source electrode of the second switching device Q2, and an opposite terminal of the light-receiving device 320 is connected to a reference wiring RF which has an predetermined voltage level. In an exemplary embodiment of the present invention, for example, a common voltage is applied to the reference wiring RF, but alternative exemplary embodiments are not limited thereto. Further, the reference wiring RF according to an exemplary embodiment may be connected to a storage line ST.

A terminal of the sensor capacitor $C_{SR}$ is connected to the source electrode of the second switching device Q2, and an opposite terminal thereof is connected to the reference wiring RF.

During the second switching device Q2 turns off when the light-receiving device 320 receives light, the light-receiving device 320 generates an electric charge having a predetermined value. The generated electric charge is stored in the sensor capacitance $C_{SR}$ and is then provided to the sensor line SR by an operation of the second switching device Q2. Specifically, the second switching device Q2 is connected to the gate line G and is thus controlled, e.g., is switched on, by a gate voltage. Since the gate line G and the sensor line SR are arranged in a substantially lattice or matrix structure (FIG. 1B), a voltage at each location of the display device 10 having a light-receiving device 320 is sensed.

Figure 5:
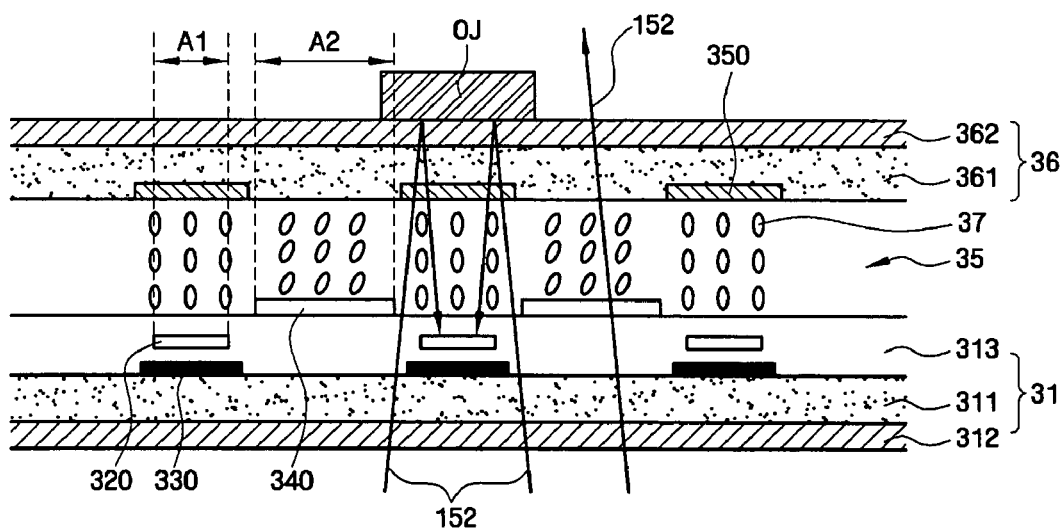
FIG. 5 is a partial cross-sectional view of a display panel of the display device according to the exemplary embodiment of the present invention shown in FIG. 1 illustrating a process of sensing infrared light according to an exemplary embodiment of the present invention.
Figure 6:
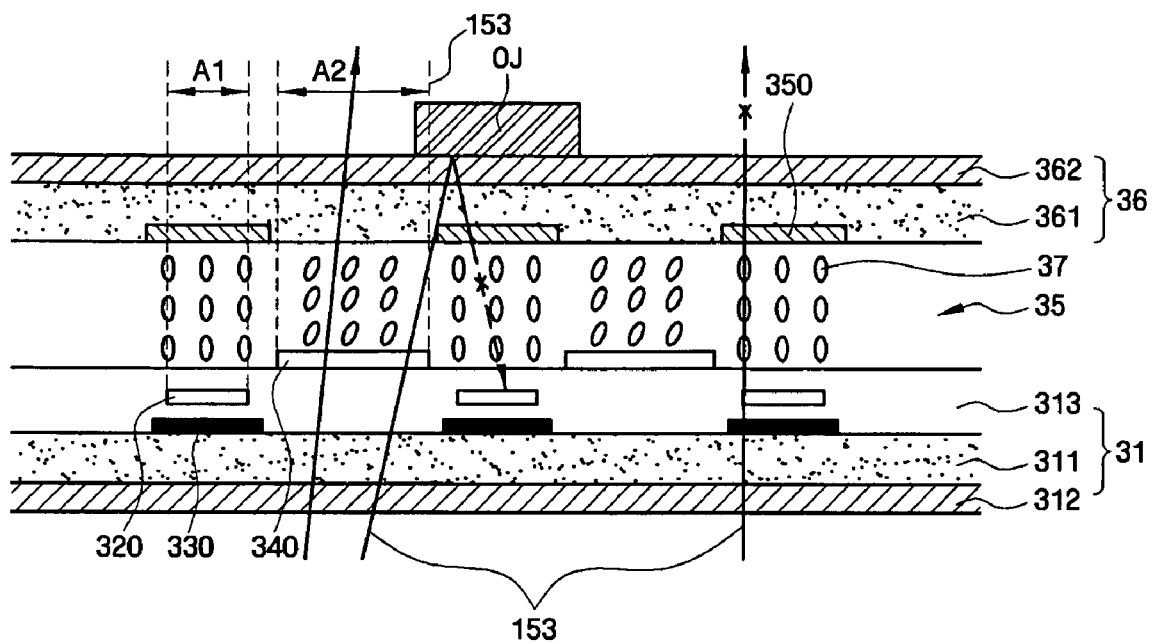
FIG. 6 is a partial cross-sectional view of a display panel of the display device according to the exemplary embodiment of the present invention shown in FIG. 1 illustrating a process of transmitting visible light according to an exemplary embodiment of the present invention.

Hereinafter, transmission characteristics of the display panel 30 for infrared light and visible light will be described in further detail. FIG. 5 is a partial cross-sectional view of a display panel of the display device according to the exemplary embodiment of the present invention shown in FIG. 1 illustrating a process of sensing infrared light according to an exemplary embodiment of the present invention. FIG. 6 is a partial cross-sectional view of a display panel of the display device according to the exemplary embodiment of the present invention shown in FIG. 1 illustrating a process of transmitting visible light according to an exemplary embodiment of the present invention.

Referring to FIG. 5, the display panel 30 includes the sensor region A1 and the pixel region A2. The sensor region A1 overlaps the light-receiving device 320, and the pixel region A2 overlaps the pixel electrode 340, as described above in greater detail.

An object OJ is placed on the sensor region A1 of the display panel 30, and infrared light 152 is irradiated from under the lower display panel 31. In an exemplary embodiment, individual rays of the infrared light 152 irradiated from under the lower display panel 31 are not parallel to each other, as shown in FIG. 5. Put another way, the infrared light 152 irradiated in various different directions.

The infrared light 152, which is incident to the sensor region A1, passes through both the lower display panel 31 and the upper display panel 36. Then, the infrared light 152 is reflected by the object OJ and is again incident to the optical filter 350. The infrared light 152, which is again incident to the optical filter 350, passes through the optical filter 350 and is then absorbed by the light-receiving device 320. As shown in FIG. 5, liquid crystal molecules 37 in the sensor region A1 remain substantially vertically aligned, as described in greater detail above.

Thus, infrared light 152 passes through the lower display panel 31 and the upper display panel 36 regardless of an alignment of liquid crystal molecules 37 in the pixel region A2 and despite the first polarizer 312 and the second polarizer 362 being disposed on the first substrate 211 and the second substrate 361, respectively.

Referring to FIG. 6, visible light 153 is irradiated to both the sensor region A1 and the pixel region A2 from under the lower display panel 31. The visible light 153 which is irradiated to the sensor region A1 passes through the lower display panel 31, which has the first polarizer 312, and the liquid crystal layer 35 and thereafter reaches the second polarizer 362. As shown in FIG. 6, the visible light 153 does not pass through the second polarizer 362, since the second polarizer 362 is arranged orthogonal to the first polarizer 312, as described in greater detail above.

However, visible light 153 which is irradiated to the pixel region A2 passes through both the first polarizer 312 and the second polarizer 362. Then, the visible light 153 is reflected by the object OJ and thereby is incident again to the upper display panel 36. The reflected visible light 153 incident to the optical filter 350 fails to pass through the optical filter 350, e.g., is absorbed by the optical filter 350. Consequently, the visible light 153 does not reach the light-receiving device 320, as shown in FIG. 6.

Figure 7A:
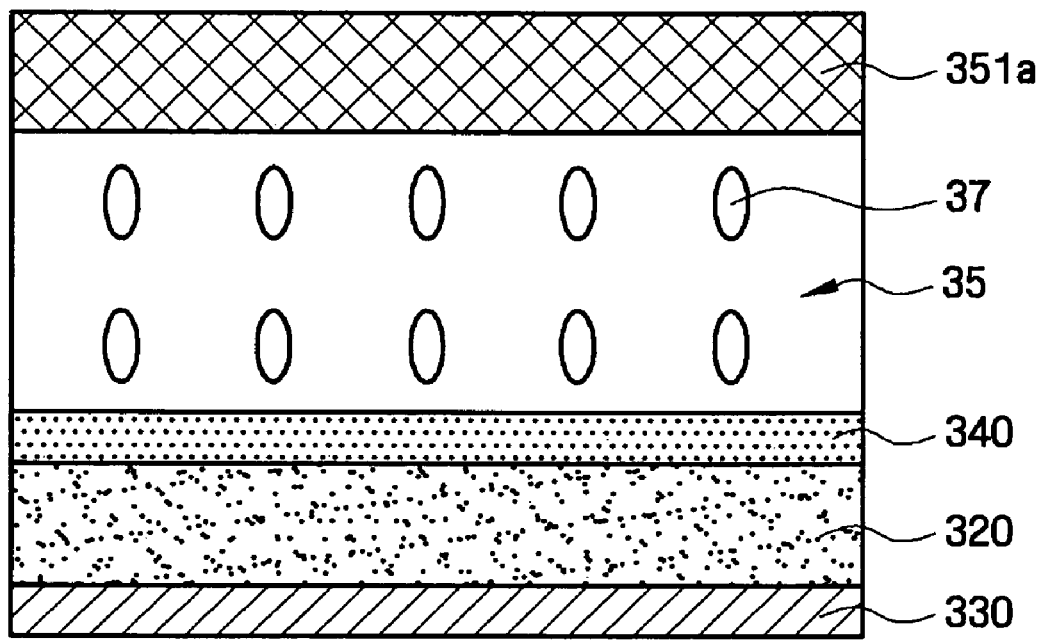
FIG. 7A is a partial cross-sectional view of a sensor region of a display device according to an alternative exemplary embodiment of the present invention.

Hereinafter, a sensor region of a display device according to an alternative exemplary embodiment of the present invention will be described in further detail with reference to FIG. 7A. FIG. 7A is a partial cross-sectional view of a sensor region of a display device according to an alternative exemplary embodiment of the present invention.

Referring to FIG. 7A, a sensor region A1 (best shown in FIGS. 5 and 6) included in a display device 10 according to an alternative exemplary embodiment of the present invention includes an optical filter 350a, a light-receiving device 320, a light-shielding pattern 330, and a contact electrode 340'.

The light-receiving device 320 is electrically connected to the light-shielding pattern 330 formed thereunder. Specifically, the light-shielding pattern 330 according to an exemplary embodiment is made of a same metal material as that of a gate line G (see FIG. 1B). Thus, the light-shielding pattern 330 not only blocks light, but also functions as a terminal of the light-receiving device 320 in the display device 10 according to an alternative exemplary embodiment of the present invention.

As shown in FIG. 7A, the contact electrode 340' is formed on the light-receiving device 320. In an exemplary embodiment, the contact electrode 340' is made of a transparent material, e.g., a material through which light can be transmitted. Specifically, the contact electrode 340' may be made of ITO or IZO, for example, similar to as for a pixel electrode. Thus, the contact electrode 340' and the light-shielding pattern 330 may be used as two electrodes of the light-receiving device 320. Further, the contact electrode 340' and the light-shielding pattern 330 overlap each other, with the light-receiving device 320 interposed therebetween. However, in order for the contact electrode 340' and the light-shielding pattern 330 to function as two terminals of the light-receiving device 320, light must be sufficiently absorbed as far as a region of the light-shielding pattern 330 disposed under the light-receiving device 320. To this end, the light-receiving device 320 must be thin. Specifically, a thickness of the light-receiving device 320 according to an exemplary embodiment of the present invention is approximately 50 nm or less.

Still referring to FIG. 7A, the optical filter 350a is formed on the light-receiving device 320 with at least the liquid crystal layer 35 disposed therebetween. In an alternative exemplary embodiment, the optical filter 350a may be formed as an organic layer such as a black matrix, for example, but alternative exemplary embodiments are not limited thereto.

Figure 7B:
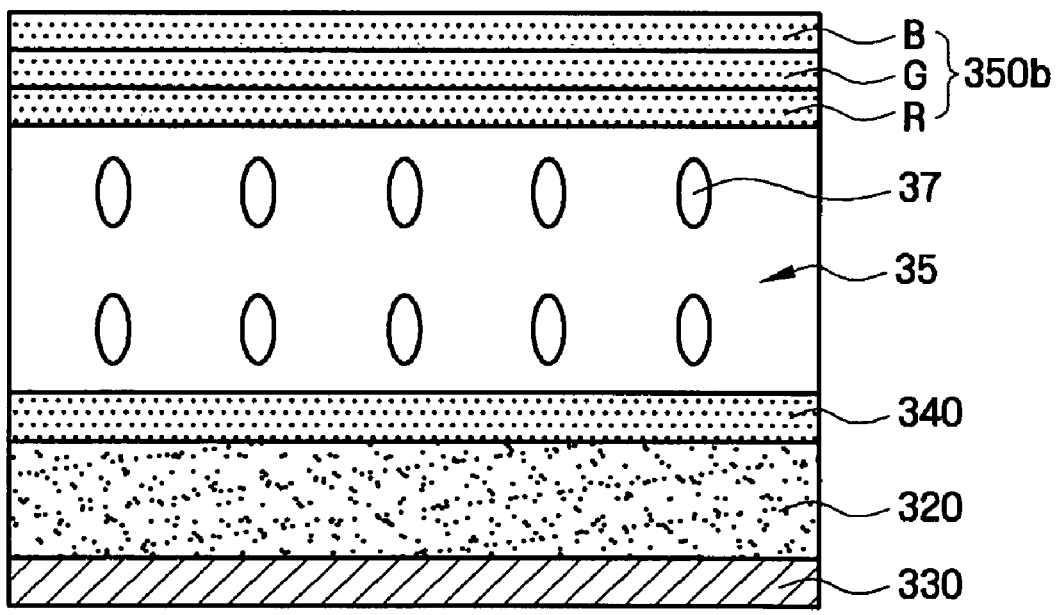
FIG. 7B is a partial cross-sectional view of a sensor region of a display device according to another alternative exemplary embodiment of the present invention.

Hereinafter, a sensor region of a display device according to another alternative exemplary embodiment of the present invention will be described in further detail with reference to FIG. 7B. FIG. 7B is a partial cross-sectional view of a sensor region of a display device according to another alternative exemplary embodiment of the present invention. For simplicity, the same reference numerals in FIG. 7B refer to elements having the same or like functions as those shown in FIGS. 1 through 7A, and thus any repetitive detailed description will hereinafter be omitted.

Referring to FIG. 7B, the sensor region A1 (FIG. 5) of a display device 10 according to another alternative exemplary embodiment of the present invention includes an optical filter 350b, a light-receiving device 320, a light-shielding pattern 330 and a contact electrode 340'.

The optical filter 350b according to an exemplary embodiment is formed by stacking red, green and blue color filters R, G and B, respectively. Specifically, each of the red, green and blue color filters R, G and B, respectively, transmits light having a predetermined wavelength in a visible light region. When the red, green and blue color filters R, G and B, respectively, overlap each other, light of the visible light region is substantially blocked, e.g., does not pass through the red, green and blue color filters R, G and B, respectively. However, infrared light 152 having a different wavelength is not fully blocked, and a large amount of infrared light (relative to visible light) passes through the red, green and blue color filters R, G and B, respectively. Thus, when the red, green and blue color filters R, G and B, respectively, are formed to overlap each other above the light-receiving device 320, the optical filter 350b, which transmits only infrared light 152, is thereby formed.

When the optical filter 350b is formed by overlapping the red, green and blue color filters R, G and B, respectively, on a color filter substrate, e.g., the second substrate 361 (FIG. 5), of a display panel 30 as described above, an additional process required to form the optical filter 350b is eliminated, which is beneficial, e.g., a manufacturing process of the display device 10 according to an exemplary embodiment of the present invention is thereby substantially increased.

In addition, when the red, green and blue color filters R, G and B, respectively, are formed to overlap each other above a TFT array (not shown) to substantially cover an upper surface of a light-receiving device 320, an optical filter 350b is formed without an additional process, as well.

Figure 7C:
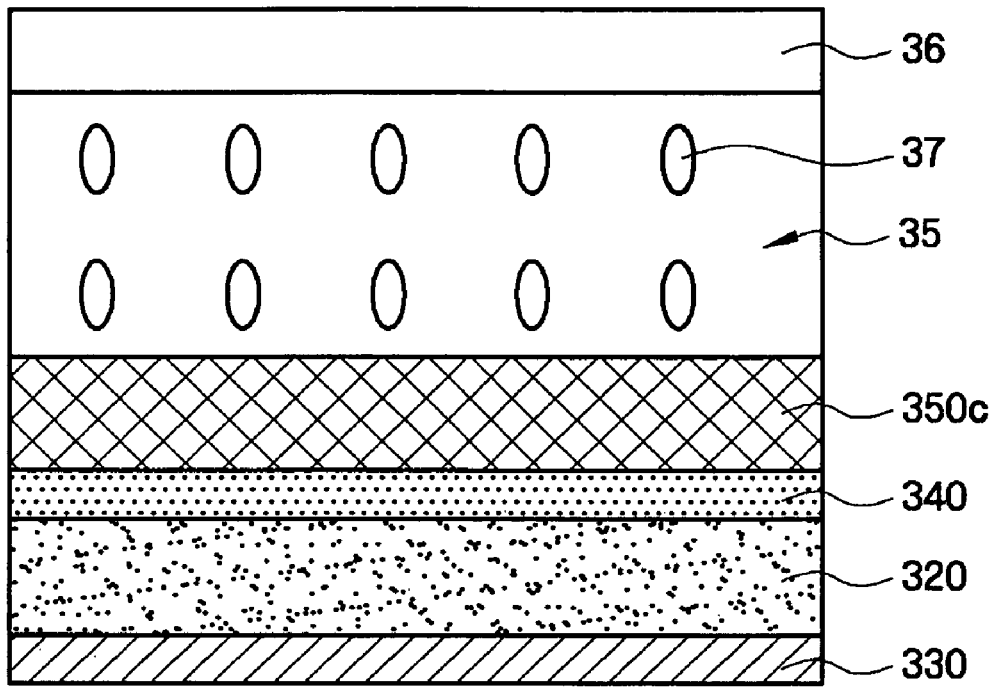
FIG. 7C is a partial cross-sectional view of a sensor region of a display device according to yet another alternative exemplary embodiment of the present invention.

Hereinafter, a sensor region of a display device according to yet another alternative exemplary embodiment of the present invention will be described in further detail with reference to FIG. 7C. FIG. 7C is a partial cross-sectional view of a sensor region of a display device according to yet another alternative exemplary embodiment of the present invention. For simplicity, elements having the same or like functions as those described above are denoted by the same reference numerals in FIG. 7C, and thus any repetitive detailed description thereof will hereinafter be omitted.

Referring to FIG. 7C, in a sensor region A1 of the a display device 10 according to an alternative exemplary embodiment of the present invention, an optical filter 350c is formed immediately on a light-receiving device 320. That is, the optical filter 350c is formed on a contact electrode 340'. Further, in an exemplary embodiment, the optical filter 350c is formed immediately, e.g., directly, on the contact electrode 340'. Thus, the light-receiving device 320 and the optical filter 350c substantially contact each other. Since a gap between the optical filter 350c and the light-receiving device 320 is thereby reduced, light other than the infrared light 152 (FIG. 5) is effectively prevented from entering between the optical filter 350c and the light-receiving device 320. As a result, sensor efficiency is thereby substantially enhanced.

Figure 7D:
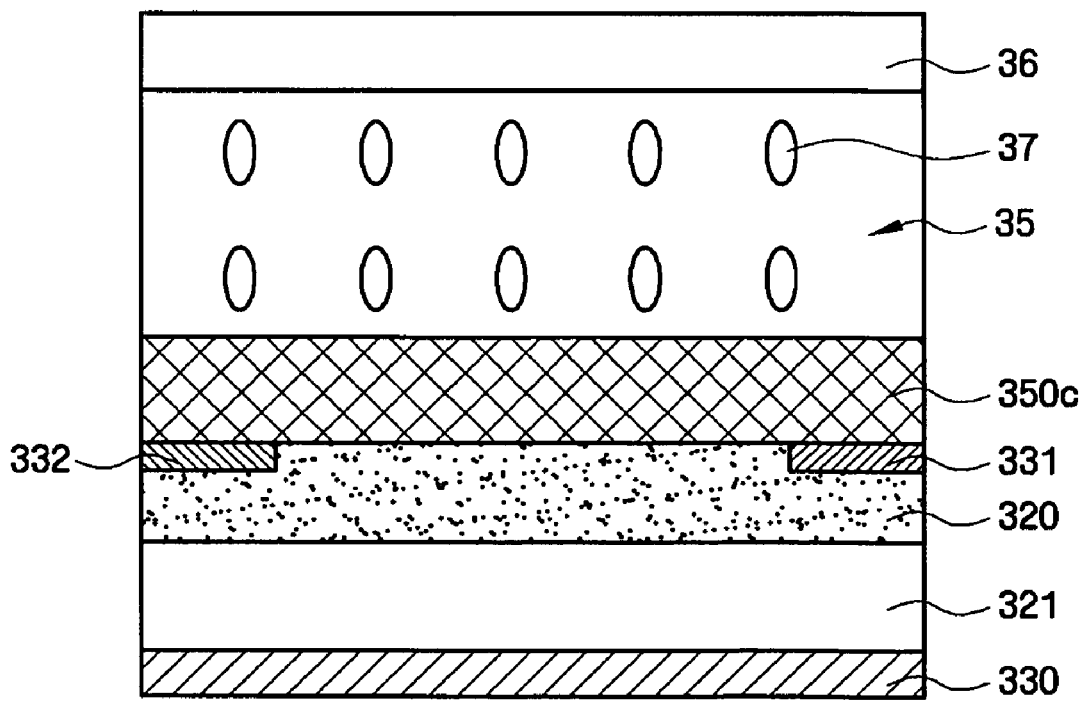
FIG. 7D is a partial cross-sectional view of a sensor region of a display device according to still another alternative exemplary embodiment of the present invention.

Hereinafter, a sensor region of a display device according to still another alternative exemplary embodiment of the present invention will be described in further detail with reference to FIG. 7D. FIG. 7D is a partial cross-sectional view of a sensor region of a display device according to still another alternative exemplary embodiment of the present invention. For simplicity, elements having the same or like functions as those described above are denoted by the same reference numerals, and thus any repetitive detailed description thereof will hereinafter be omitted.

Referring to FIG. 7D, a display device 10 according to an alternative exemplary embodiment of the present invention includes an insulating film 321 disposed between a light-receiving device 320 and a light-shielding pattern 330, as well as a first contact electrode 331 and a second contact electrode 332 both disposed in an upper portion of the light-receiving device 320.

In an exemplary embodiment, the light-shielding pattern 330 is made of a gate metal (described in greater detail above), and the insulating film 321 is formed on the light-shielding pattern 330 to insulate the light-shielding pattern 330 from the light-receiving device 320. Further, the light-receiving device 320 may be formed on the insulating film 321, and the first contact electrode 331 and the second contact electrode 332 may be formed in the upper portion of the light-receiving device 320, as shown in FIG. 7D.

Since the first contact electrode 331 and the second contact electrode 332 are formed on opposite sides of the upper portion of the light-receiving device 320, the first contact electrode 331 and the second contact electrode 332 function as terminals of the light-receiving device 320 and also block light which is laterally incident to the light-receiving device 320.

In an exemplary embodiment of the present invention, a thickness of the light-receiving device 320 essentially does not affect the first contact electrode 331 and the second contact electrode 332, and light is absorbed in substantially all regions between the first contact electrode 331 and the second contact electrode 332. Thus, the light-receiving device 320 may be thicker than as described above with reference to alternative exemplary embodiments of the present invention.

Specifically, in an exemplary embodiment, a thickness of the light-receiving device 320 is in a range of approximately 50 nm to approximately 100 nm or, alternatively, the thickness of the light-receiving device 320 may be greater than approximately 100 nm.

Figure 8:
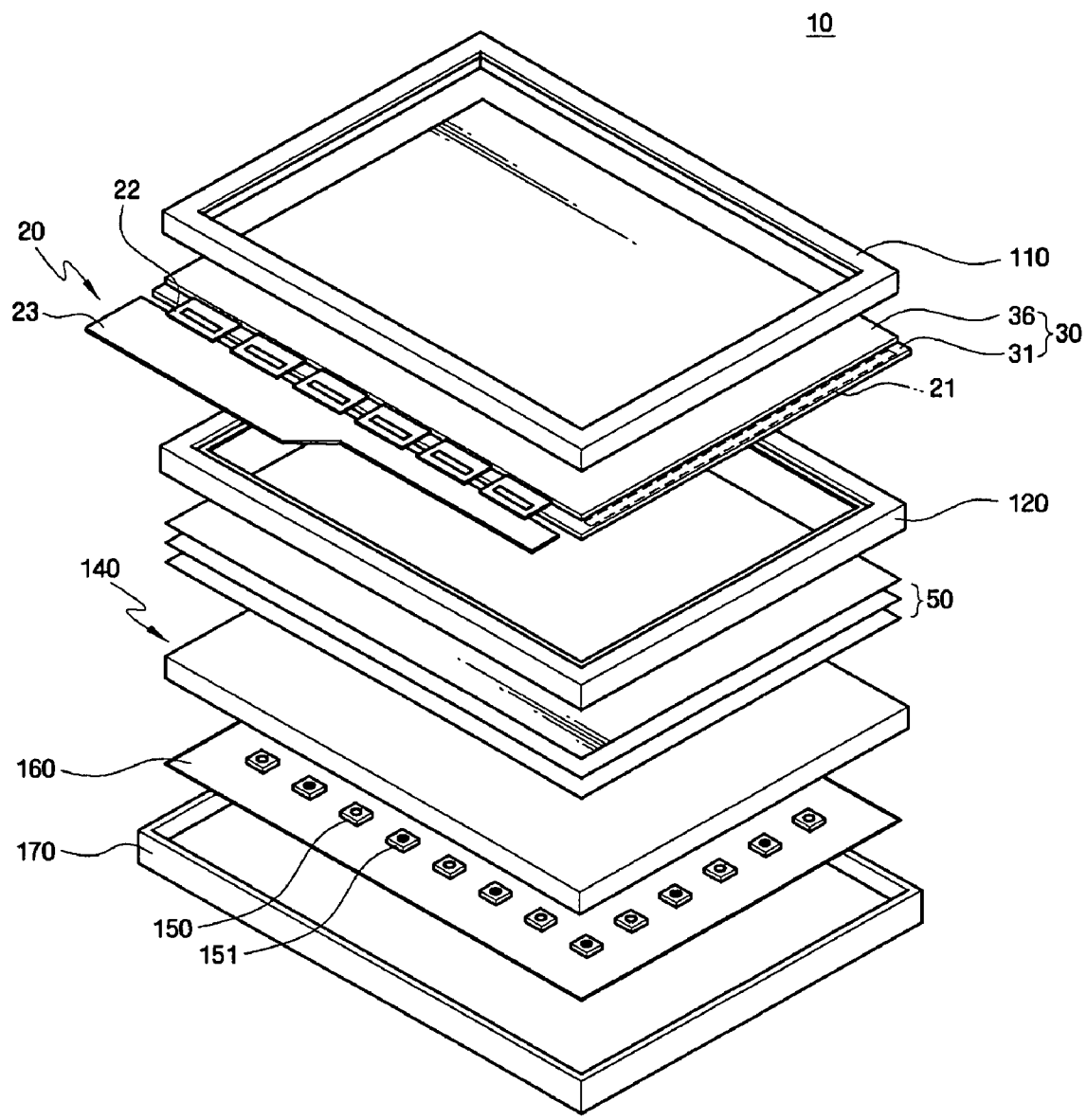
FIG. 8 is an exploded perspective view of a display device according to an exemplary embodiment of the present invention.

Hereinafter, a display device 10 according to an exemplary embodiment of the present invention will be described in further detail. FIG. 8 is an exploded perspective view of a display device according to an exemplary embodiment of the present invention. In FIG. 8, the same reference characters refer to the same or like elements as in FIGS. 1-7D, and any repetitive detailed description thereof has hereinafter been omitted.

Referring to FIG. 8, the display device 10 according to an exemplary embodiment of the present invention includes a display panel assembly 20, an intermediate frame 120, an upper case 110, an optical sheet 50, a diffuser plate 140, light sources 150, and a lower case 170.

The display panel assembly 20 includes the display panel 30, which includes the lower display panel 31 and the upper display panel 36, a liquid crystal layer 35 (FIG. 2), a gate driving integrated circuit ("IC") 21, a data chip film package 22, and a printed circuit board ("PCB") 23.

The display panel 30 includes the lower display panel 31 and the upper display panel 36. The lower display panel 31 includes gate lines G (FIGS. 1B and 3), data lines D (FIGS. 1B and 3), TFT arrays and pixel electrodes 340 (FIG. 2), for example. The upper display panel 36 is disposed opposite the lower display panel 31, e.g., faces the lower display panel 31, and includes a color filter, a black matrix and a common electrode, for example. In an alternative exemplary embodiment, the color filter and the common electrode may also be formed on the lower display panel 31.

The gate driving IC 21 is integrated with the lower display panel 31 and is connected to each gate line G formed on the lower display panel 31. The data chip film package 22 is connected to each data line D formed on the lower display panel 31. Here, the data chip film package 22 includes a wiring pattern, in which semiconductor chips are formed on a base film, and a tap automated bonding ("TAB") tape which is bonded with the semiconductor chips by TAB technology. In an exemplary embodiment of the present invention, the data chip film package 22 may be a tape carrier package ("TCP") or a chip on film ("COF"), for example, but alternative exemplary embodiments are not limited thereto.

A number of driving parts are mounted on the PCB 23 to transmit a gate-driving signal to the gate driving IC 21 and a data-driving signal to the data chip film package 22.

The light sources 150 supply light to the display panel 30. In an exemplary embodiment of the present invention, the light sources 150 are point light sources, such as light-emitting diodes ("LEDs"), for example, or, alternatively, line light sources such as cold cathode fluorescent lamps ("CCFLs") or hot cathode fluorescent lamps ("HCFLs"), but are not limited thereto.

The light sources 150 are mounted on a circuit board 160, and the infrared lamps 151 are disposed between the light sources 150, as shown in FIG. 8.

The diffuser plate 140 diffuses light received from the light sources 150 to prevent the light from being concentrated in individual, e.g., discrete regions. In an exemplary embodiment, the diffuser plate 140 is disposed on the light sources 150.

The optical sheet 50 is disposed on the diffuser plate 140 to diffuse and concentrate light from the diffuser plate 140. In an alternative exemplary embodiment, the optical sheet 50 may include one or more of a diffuser sheet, a prism sheet and/or a protective sheet.

The intermediate frame 120 includes four sidewalls and has a substantially rectangular shape, as shown in FIG. 8. The intermediate frame 120 is disposed in the lower case 170 and is installed on outer surfaces of sidewalls of the lower case 170.

The display panel 30 is disposed on the optical sheet 50 and is received in the intermediate frame 120. In an exemplary embodiment, the intermediate frame 120 is formed as a mold frame made of a plastic material, for example, in order to prevent parts fixed by the intermediate frame 120 from being damaged.

The upper case 110 is disposed in and coupled to the lower case 170 to substantially cover an upper surface of the display panel 30 which is disposed in the intermediate frame 120. Further, the upper case 110 has an aperture, e.g. a window, in an upper surface thereof to expose the display panel 30. Like the lower case 170, the upper case 110 according to an exemplary embodiment is made of a metal material substantially the same as that of, for example, a chassis, to resist external impacts and provide a secure electrical ground capability. In an exemplary embodiment, the upper case 110 is coupled to the lower case 170 by a hook, for example. In addition, the PCB 23 of the display panel assembly 20 is bent along an outer surface of the intermediate frame 120 and is installed on a side or a rear surface of the lower case 170.

Figure 9:
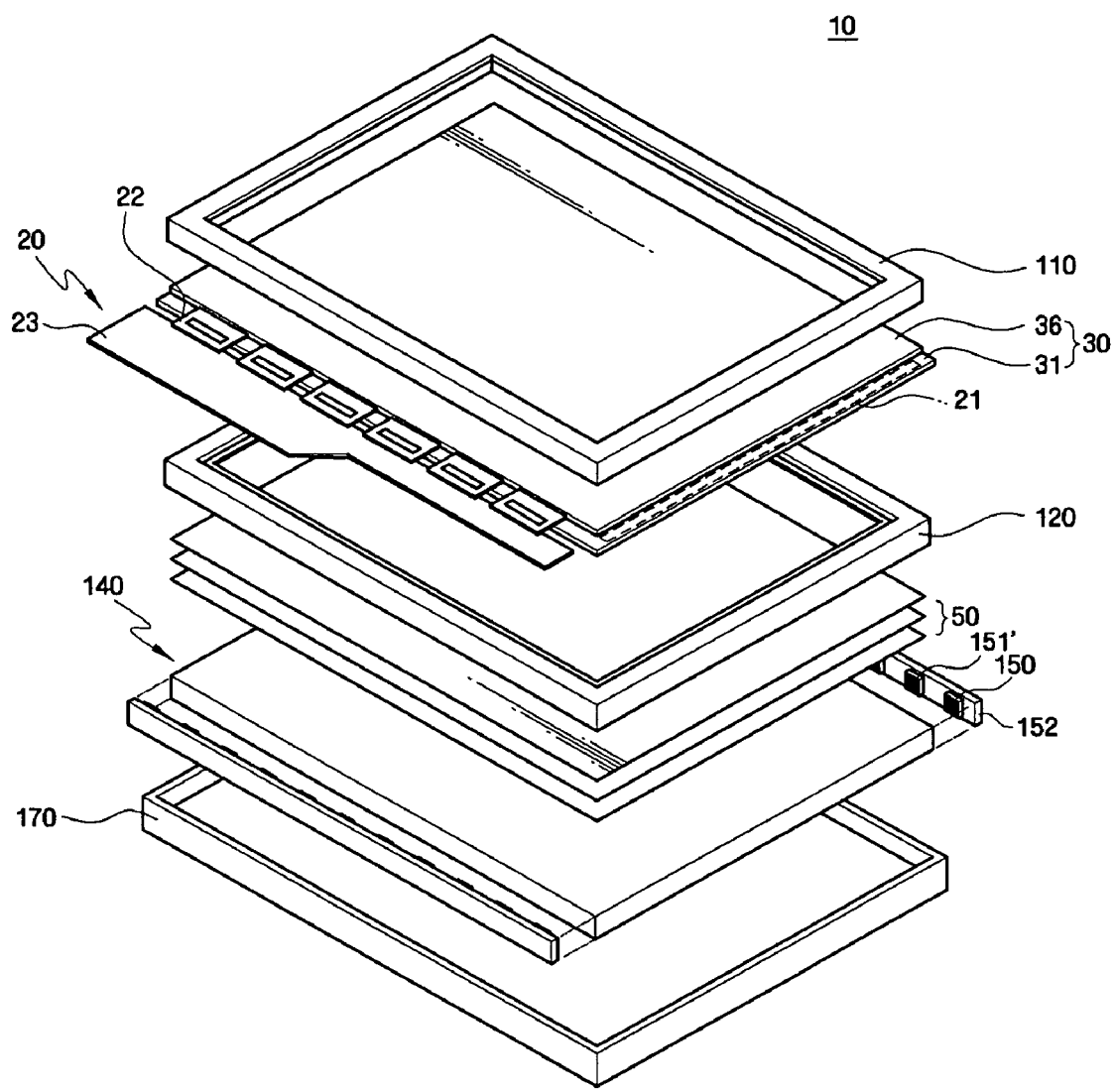
FIG. 9 is an exploded perspective view of a display device according to an alternative exemplary embodiment of the present invention.

Hereinafter, a display device according to an alternative exemplary embodiment of the present invention will be described in further detail with reference to FIG. 9. FIG. 9 is an exploded perspective view of a display device according to an alternative exemplary embodiment of the present invention. For simplicity, elements having the same or like functions as those shown in FIGS. 1-8 are indicated by the same reference numerals, and thus any repetitive detailed description thereof will hereinafter be omitted.

A display device 10 according to an alternative exemplary embodiment of the present invention is an edge-type display device 10 in which light sources 150 are disposed on a side surface or, alternatively, two opposite side surfaces of a light guide plate 140'.

The light guide plate 140' guides light from the light sources 150 and provides the light to a display panel 30. Specifically, the light guide plate 140' receives the light from the light sources 150, disposed on the side surfaces thereof, and provides the received light to the display panel 30 in the form of surface light sources.

A circuit board 152, on which the light sources 150 and infrared lamps 151' are arranged, is placed on each of the two opposite side surfaces of the light guide plate 140'. Visible light and infrared light provided by the light sources 150 and the infrared lamps 151, respectively, are reflected within the light guide plate 140' and are then sent to the display panel 30.

According to exemplary embodiments of the present invention as described herein, a display device recognizes images even when polarizers are formed on opposite surfaces of a display panel of the display device.

The present invention should not be construed as being limited to the exemplary embodiments set forth herein. Rather, these exemplary embodiments are provided so that this disclosure will be thorough and complete and will fully convey the concept of the present invention to those skilled in the art. Further, the exemplary embodiments described herein should be considered in a descriptive sense only and not for purposes of limitation.

While the present invention has been particularly shown and described with reference to exemplary embodiments thereof, it will be understood by those of ordinary skill in the art that various changes in form and detail may be made therein without departing from the spirit or scope of the present invention as defined by the following claims.

What is claimed is:

1. A display device comprising:
   a first substrate;
   a gate line formed on the first substrate;
   a first switching device connected to the gate line;
   a pixel electrode connected to the first switching device;
   a light-receiving device formed on the first substrate and which senses infrared light;
   a light-shielding pattern disposed between the first substrate and the light receiving device, and which overlaps the light-receiving device and blocks light.

2. The display device of claim 1, further comprising an optical filter which is disposed opposite the light-receiving device, overlaps the light-receiving device and transmits light having a predetermined wavelength.

3. The display device of claim 2, wherein the optical filter transmits the infrared light.

4. The display device of claim 2, wherein an energy band gap of the optical filter is greater than an energy band gap of the light-receiving device.

5. The display device of claim 2, wherein at least one of the light-receiving device and the optical filter comprises hydrogenated amorphous silicon germanium (a-SiGe:H).

6. The display device of claim 2, wherein the light-receiving device comprises hydrogenated amorphous silicon germanium (a-SiGe:H), and the optical filter comprises hydrogenated amorphous silicon (a-Si:H).

7. The display device of claim 2, wherein the light-receiving device comprises polycrystalline silicon (p-Si), and the optical filter comprises hydrogenated amorphous silicon germanium (a-SiGe:H).

8. The display device of claim 1, further comprising a color filter which overlaps the light-receiving device, wherein the color filter transmits the infrared light.

9. The display device of claim 8, wherein the color filter comprises at least one of a red color filter, a green color filter and a blue color filter.

10. The display device of claim 1, further comprising a black matrix which overlaps the first switching device and the light-receiving device, wherein the black matrix transmits the infrared light.

11. The display device of claim 1, wherein the light-receiving device comprises a semiconductor layer which comprises at least one of amorphous silicon (a-Si), polycrystalline silicon (p-Si) and crystalline silicon (c-Si).

12. The display device of claim 1, wherein the light-receiving device comprises one of a thin-film transistor (TFT), a photodiode and a photoresistor.

13. The display device of claim 1, further comprising a second switching device connected to the light-receiving device and the gate line.

14. The display device of claim 13, further comprising a sensor line connected to the second switching device.

15. The display device of claim 1, further comprising:
   a second substrate facing the first substrate;
   a first polarizers disposed on an outer surface of the first substrate; and
   a second polarizer disposed on an outer surface of the second substrate.

16. The display device of claim 15, further comprising an infrared light source disposed on an outer peripheral side of the first substrate and which emits the infrared light.

17. The display device of claim 16, wherein the infrared light source is disposed directly on a lower surface of the first substrate.

18. The display device of claim 16, further comprising a light guide plate disposed immediately under the first substrate and guides light, wherein the infrared light source is disposed on peripheral sides of the light guide plate.

19. The display device of claim 1, wherein the light-shielding pattern and the gate line are made of a same material.

20. The display device of claim 1, further comprising:
   a second substrate facing the first substrate; and
   a liquid crystal layer disposed between the first substrate and the second substrate.

21. The display device of claim 20, wherein an initial alignment of liquid crystal molecules disposed in a first region of the liquid crystal layer where the liquid crystal layer overlaps the light-receiving device is maintained during realignment of liquid crystal molecules disposed in a second region of the liquid crystal layer different from the first region.

22. A display device comprising:
   a display panel which displays images;
   a first polarizer disposed on a first outer surface of the display panel;
   a second polarizer disposed on a second outer surface of the display panel opposite the first outer surface;
   an infrared light source disposed on an outer peripheral side of the display panel and which provides infrared light to the display panel; and
   a light-shielding pattern which overlaps the light-receiving device and is disposed between the light-receiving device and the infrared light source,
   wherein the display panel comprises a light-receiving device which senses the infrared light.

23. The display device of claim 22, further comprising an optical filter which overlaps the light-receiving device and transmits light having a predetermined wavelength.

24. The display device of claim 23, wherein the light-receiving device is disposed between the optical filter and the light-shielding pattern.

25. The display device of claim 23, wherein a thickness of the optical filter is in a range of approximately 1,000 nm to approximately 3,000 nm.

26. The display device of claim 22, further comprising a contact electrode disposed on the light-receiving device.

27. The display device of claim 26, wherein a thickness of the light-receiving device is approximately 50 nm or less.

28. The display device of claim 22, further comprising a first contact electrode and a second contact electrode disposed in an upper portion of the light-receiving device.

29. The display device of claim 28, wherein a thickness of the light-receiving device is in a range of approximately 50 nm to approximately 100 nm.

* * * * *